(12) United States Patent
Hasegawa et al.

(10) Patent No.: US 11,836,942 B2
(45) Date of Patent: Dec. 5, 2023

(54) INFORMATION INTEGRATION METHOD, INFORMATION INTEGRATION DEVICE, AND INFORMATION INTEGRATION PROGRAM

(71) Applicant: Nippon Telegraph and Telephone Corporation, Tokyo (JP)

(72) Inventors: Keisuke Hasegawa, Tokyo (JP); Masato Ono, Tokyo (JP); Koji Namba, Tokyo (JP); Takahide Hoshide, Tokyo (JP); Tetsuya Yamaguchi, Tokyo (JP); Akira Ono, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 465 days.

(21) Appl. No.: 17/279,216

(22) PCT Filed: Sep. 13, 2019

(86) PCT No.: PCT/JP2019/036122
§ 371 (c)(1),
(2) Date: Mar. 24, 2021

(87) PCT Pub. No.: WO2020/066698
PCT Pub. Date: Apr. 2, 2020

(65) Prior Publication Data
US 2022/0028105 A1 Jan. 27, 2022

(30) Foreign Application Priority Data
Sep. 28, 2018 (JP) ................... 2018-185025

(51) Int. Cl.
*G06T 7/70* (2017.01)
*G06T 7/62* (2017.01)
*G06T 7/50* (2017.01)

(52) U.S. Cl.
CPC ............. *G06T 7/70* (2017.01); *G06T 7/50* (2017.01); *G06T 7/62* (2017.01)

(58) Field of Classification Search
CPC .... G06T 7/50; G06T 7/62; G06T 7/70; G06T 7/73; G06T 3/4038
See application file for complete search history.

(56) References Cited

U.S. PATENT DOCUMENTS 10,797,811 B2 * 10/2020 Kitazato ............ H04N 21/2665
2017/0278289 A1 * 9/2017 Marino .................. G06T 7/536

OTHER PUBLICATIONS

Benot, et al. (Computer English Translation of WIPO Application Publication No. WO 2008/014826 A1), pp. 1-23. (Year: 2008).*

(Continued)

*Primary Examiner* — Daniel G Mariam
(74) *Attorney, Agent, or Firm* — Fish & Richardson P.C.

(57) ABSTRACT

The present invention is to improve accuracy of position information of an object. A labeling unit 13 of an information integration device 1 associates a label included in tracking data with an object area having a largest ratio of overlapping areas overlapping label areas included in the tracking data with regard to the object area or an object area having a largest size of overlapping areas overlapping label areas included in the tracking data, among a plurality of object areas included in a Depth map.

12 Claims, 11 Drawing Sheets

(56) References Cited

OTHER PUBLICATIONS

Ishii et al., "Kirari! Tracker: Human Detection and Tracking System by Using LiDAR and Deep Learning Engine," Video Information Media Society, Winter Games, 2017, 5 pages (with English Translation).

Kakinuma et al., "Real-time Image Segmentation using Machine Learning Techniques for 4K Video," Video Information Media Society, Winter Games, 2017, 5 pages (with English Translation).

* cited by examiner (a) BASIC CASE (b) CASE WHERE PLURALITY OF AREAS ARE ASSOCIATED WITH SAME LABEL (c) CASE WHERE PLURALITY OF LABELS ARE ASSOCIATED WITH SAME AREA (a) BASIC CASE (b) CASE WHERE PLURALITY OF AREAS ARE ASSOCIATED WITH SAME LABEL (c) CASE WHERE PLURALITY OF LABELS ARE ASSOCIATED WITH SAME AREA (a)

(b)

INFORMATION INTEGRATION METHOD, INFORMATION INTEGRATION DEVICE, AND INFORMATION INTEGRATION PROGRAM

CROSS-REFERENCE TO RELATED APPLICATIONS

This application is a National Stage application under 35 U.S.C. § 371 of International Application No. PCT/JP2019/036122, having an International Filing Date of Sep. 13, 2019, which claims priority to Japanese Application Serial No. 2018-185025, filed on Sep. 28, 2018. The disclosure of the prior application is considered part of the disclosure of this application, and is incorporated in its entirety into this application.

TECHNICAL FIELD

The present invention relates to a technique for integrating position information of an object transmitted from space to space and particularly to a technique for integrating a Depth map obtained by measuring the same object and position information of tracking data.

BACKGROUND ART

Currently, real-time transmission techniques for the entire competition space are under research and development. In such techniques, a plurality of pieces of sensor information acquired at a local venue are integrated and processed in real time according to the use application, and the information is transmitted in synchronization with video and audio acquired at the venue.

FIG. 9 is a diagram illustrating an overall image of one example of a system which realizes the technique. A transmission device 100 receives sensor information from a depth-of-field measuring sensor 31 and a position information tracking sensor 32 of a competition venue and acquires three-dimensional position information of an object as a subject to perform an integration or the like, and receives media information from an imaging device 33 and the sound collection device 34 of the same venue and synchronizes three-dimensional position information of the object and the media information on the basis of time information (time-stamp) to distribute the information to a video control device 51 and an audio control device 52 of a remote venue.

For example, the video control device 51 outputs the video data of the media information to a naked eye 3D display screen 53 to display the data on a virtual image display panel 54 and controls the position and size of a video material by using the three-dimensional position information of the object. For example, the audio control device 52 outputs the audio data of the media information to each of wavefront synthesis speaker arrays 55 and 56 for competition sound and for cheer sound and controls the position of the audio material by using the three-dimensional position information of the object.

The technique makes it possible to control the position and size of the video material and the audio material to be reproduced in the remote venue according to the movement of the object of the competition venue; for example, to process and convert the object in real time according to the use application. Accordingly, various reproduction expressions such as depth expression and sound image localization can be achieved synchronously in time and space with a high sense of reality.

CITATION LIST

Non-Patent Literature

Non-Patent Literature 1: Kakinuma et al., "4K real-time subject extraction framework using machine learning", Video Information Media Society, Winter Annual Convention, 2017, 15B-2

Non-Patent Literature 2: Ishii et al., "Kirari! Tracker: study of real-time specific person tracking system using Lidar and deep learning engine", Video Information Media Society, Winter Annual Convention, 2017, 15B-3

SUMMARY OF THE INVENTION

Technical Problem

As described above, the transmission device 100 receives sensor information from a plurality of sensors, acquires three-dimensional position information of the object, and distributes the three-dimensional position information in synchronization with media information. However, the sensor information acquired from each of the plurality of sensors has different accuracy depending on the type of sensor. Therefore, it is desirable to improve the accuracy of the three-dimensional position information of the object by combining and integrating the respective types of sensor information.

For example, as illustrated in FIG. 10, it is conceivable to improve the accuracy of the position information of the object having a label attached to an object area by the combination of position information on image coordinates of the object (contour coordinate information of the object) obtained from the Depth map with label information (player A, player B) included in the tracking data and position information (coordinate information) on image coordinates of a rectangular frame surrounding the object. This is because the Depth map has high accuracy of the contour information of the object but low accuracy of depth information, while the tracking data has low accuracy of contour information but high accuracy of depth information.

However, when both the Depth map and the tracking data are not accurate, it is difficult to uniquely combine the position information of the object obtained from the Depth map with the position information and the label information of the object included in the tracking data. For example, as illustrated in FIG. 11, when one label includes two areas (object areas cut out from the Depth map) and one label also includes an area corresponding to noise, since a plurality of areas correspond to one label, the area corresponding to the label cannot be identified.

An object of the present invention, which has been made in consideration of the above situation, is to improve the accuracy of position information of an object.

Means for Solving the Problem

An information integration method of the present invention is an information integration method performed by a transmission device for synchronously transmitting media information and sensor information on an object in a first space to a second space, wherein an information integration device performs a first step of receiving, as sensor information, a Depth map of an object and tracking data including label areas, which are areas of the object in an image, and a label indicating the object, and a second step of associating a label corresponding to the label area included in the tracking data with an object area having a largest ratio of overlapping areas, among a plurality of object areas included in the Depth map, overlapping the label areas included in the tracking data with respect to the object areas or an object area having a largest size of the overlapping areas overlapping the label areas included in the tracking data.

In the information integration method, in the second step, the label is associated with one area including the plurality of object areas when ratios of the plurality of overlapping areas to be compared is equal to each other or when sizes of the plurality of overlapping areas to be compared is equal to each other.

In the information integration method, in the second step, when one object area is included in the plurality of label areas, a label corresponding to each of the label areas is associated with each of the plurality of object areas that are the same as the one object area.

In the information integration method, in the second step, a label is associated with the object area having the largest ratio of the overlapping area when a noise area is not included in the plurality of object areas, and a label is associated with the object area having the largest size of the overlapping area when the noise area is included in the plurality of object areas.

An information integration device of the present invention is an information integration device included in a transmission device for synchronously transmitting media information and sensor information on an object in a first space to a second space, the information integration device including: a sensor information reception unit configured to receive, as sensor information, a Depth map of an object and tracking data including label areas, which are areas of the object in an image, and a label indicating the object; and a labeling unit configured to associate a label corresponding to the label area included in the tracking data with an object area having a largest ratio of overlapping areas, among a plurality of object areas included in the Depth map, overlapping the label areas included in the tracking data with respect to the object areas or an object area having a largest size of the overlapping areas overlapping the label areas included in the tracking data.

An information integration program of the present invention causes a computer to execute the information integration method.

Effects of the Invention

According to the present invention, it is possible to improve accuracy of position information of an object.

DESCRIPTION OF EMBODIMENTS

Hereinafter, one embodiment for implementing the present invention will be described by using the drawings.

<Configuration of Transmission Device>

Figure 1:
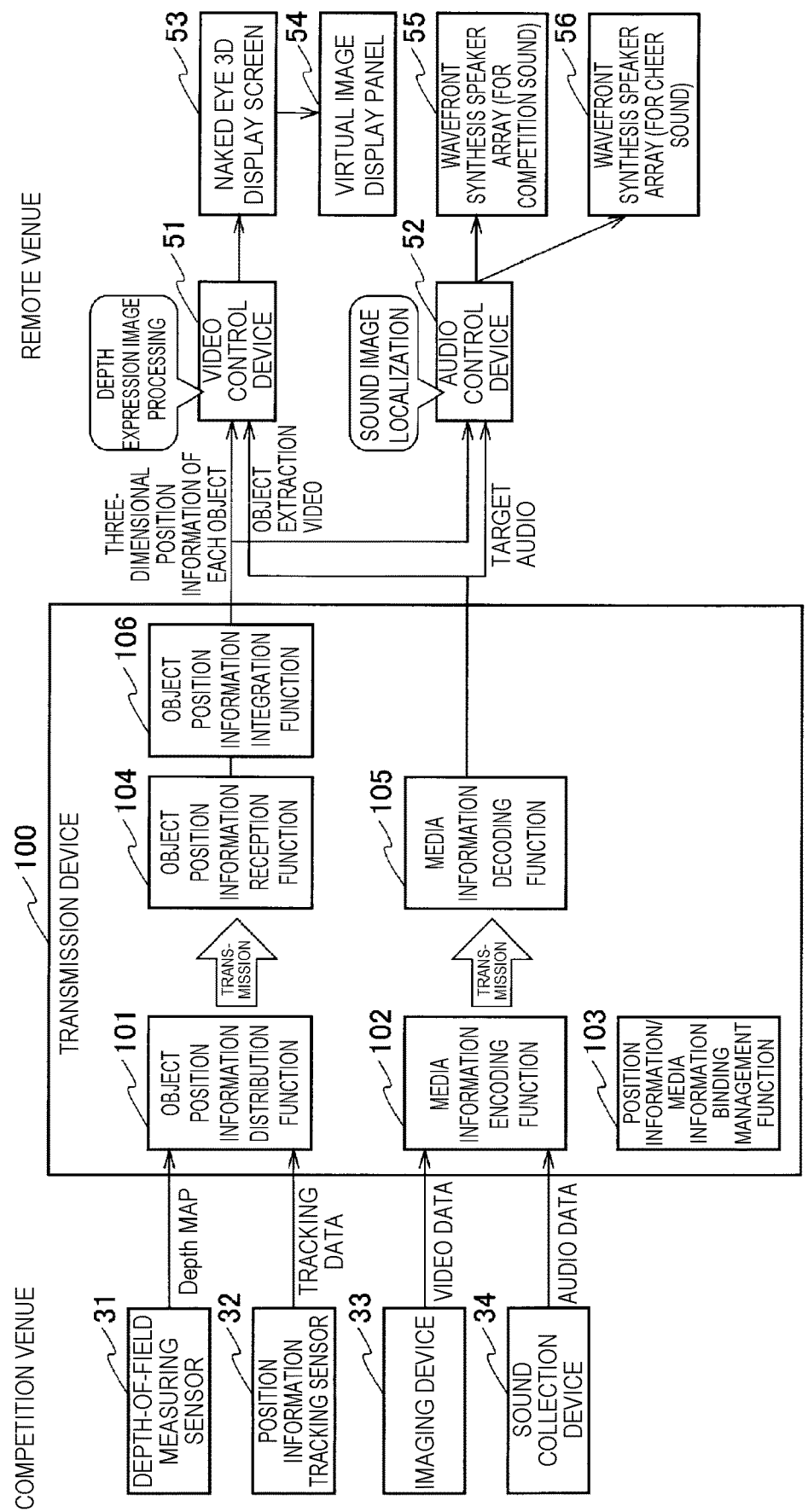
FIG. 1 is a diagram illustrating a functional example of a transmission device.

First, the configuration of the transmission device is described. FIG. 1 is a diagram illustrating an example of a function of a transmission device 100. The transmission device 100 is a device for synchronously transmitting sensor information on an object in a competition venue (a first space) and media information to a remote venue (a second space).

The transmission device 100 is configured by a reception side for receiving the sensor information and the media information from the competition venue and a distribution side for distributing three-dimensional position information, which is obtained on the basis of the sensor information, for each object and the media information to the remote venue. The reception side and the distribution side are connected by a transmission line to be able to communicate with each other.

As illustrated in FIG. 1, the reception side is configured by an object position information distribution function 101, a media information encoding function 102, and a position information/media information binding management function 103.

The object position information distribution function 101 has a function of receiving position information obtained by a plurality of sensors, integrating the position information to generate position information that makes a three-dimensional position of a subject identifiable, and transmitting the position information to the distribution side. For example, the position information obtained by the plurality of sensors is depthwise position data (for example, a Depth map) of the subject obtained the depth-of-field measuring sensor 31 and two-dimensional positional information (tracking data) of the subject obtained by the position information tracking sensor 32.

The Depth map is data obtained by segmenting only an object area and masking the area except the object area. Further, the Depth map is a magnitude of deviation for each pixel between images obtained by imaging with a stereo camera, and parallax information is converted into distance information by a triangulation method. The Depth map is also called a parallax map and corresponds to the distance information. In Non-Patent Literature 1, a method for extracting the subject using machine learning is described, and in this case, a result obtained by calculating the parallax and depth between the subject and the camera is obtained as a Depth map.

The tracking data is position information of a label and an object associated with the label. The label is used to identify the object and is utilized to identify a sound source and to associate the object with a profile. In Non-Patent Literature 2, a method for tracking an object using LiDAR and a deep learning engine is described, and the three-dimensional position of the subject is represented in rectangular form.

The media information encoding function 102 has a function of receiving the media information output by the imaging device 33 and the sound collection device 34, performing an encoding process on each of the video data and the audio data of the media information, and transmitting the result to the distribution side.

The position information/media information binding management function 103 has a function for managing the position information of the object processed by the object position information distribution function 101 in association with the media information processed by the media information encoding function 102 on the basis of the time information.

As illustrated in FIG. 1, the distribution side is configured by an object position information reception function 104, a media information decoding function 105, and an object position information integration function 106.

The object position information reception function 104 has a function of receiving and holding the position information transmitted from the object position information distribution function 101 and distributing the held position information in response to a position information acquisition request from the video control device 51 or the audio control device 52. As a distribution method, for example, push distribution by a Websocket interface and distribution accompanied by buffering by a MIDI interface are used. The object position information reception function 104 receives designation of a frame rate at the time of receiving the position information acquisition request, converts the position information requested for each connection into the designated frame rate, and distributes the result.

The media information decoding function 105 has a function of receiving the media information transmitted from the media information encoding function 102 and distributing the media information to the video control device 51 and the audio control device 52.

The object position information integration function 106 has a function of managing position information of a plurality of viewpoints obtained by measuring the object from a plurality of directions in association with time information, generating and holding highly accurate position information by combining the position information of the plurality of viewpoints, and distributing the held highly accurate position information in response to the position information acquisition request from the video control device 51 or the audio control device 52. A connection interface used by the object position information integration function 106 is the same as that of the object position information reception function 104 and corresponds to a Websocket interface, a MIDI interface, and the like.

The above description is an example of the function of the transmission device 100. When attention is paid to sensor information, the transmission device 100 operates as follows. For example, in a case where four sets of the depth-of-field measuring sensor 31 and the position information tracking sensor 32 are prepared and arranged in east, west, south, and north of the competition venue, the object position information distribution function 101 receives the sensor information obtained by the measurement of each of the four sets, and integrally transmits the position information of the Depth map and the position information of the tracking data for each set. The object position information reception function 104 receives and holds the position information of the object for each set and distributes the position information in response to the position information acquisition request. The object position information integration function 106 generates highly accurate position information by combining each set of position information and distributes the position information in response to the position information acquisition request.

SUMMARY OF INVENTION

Figure 2:
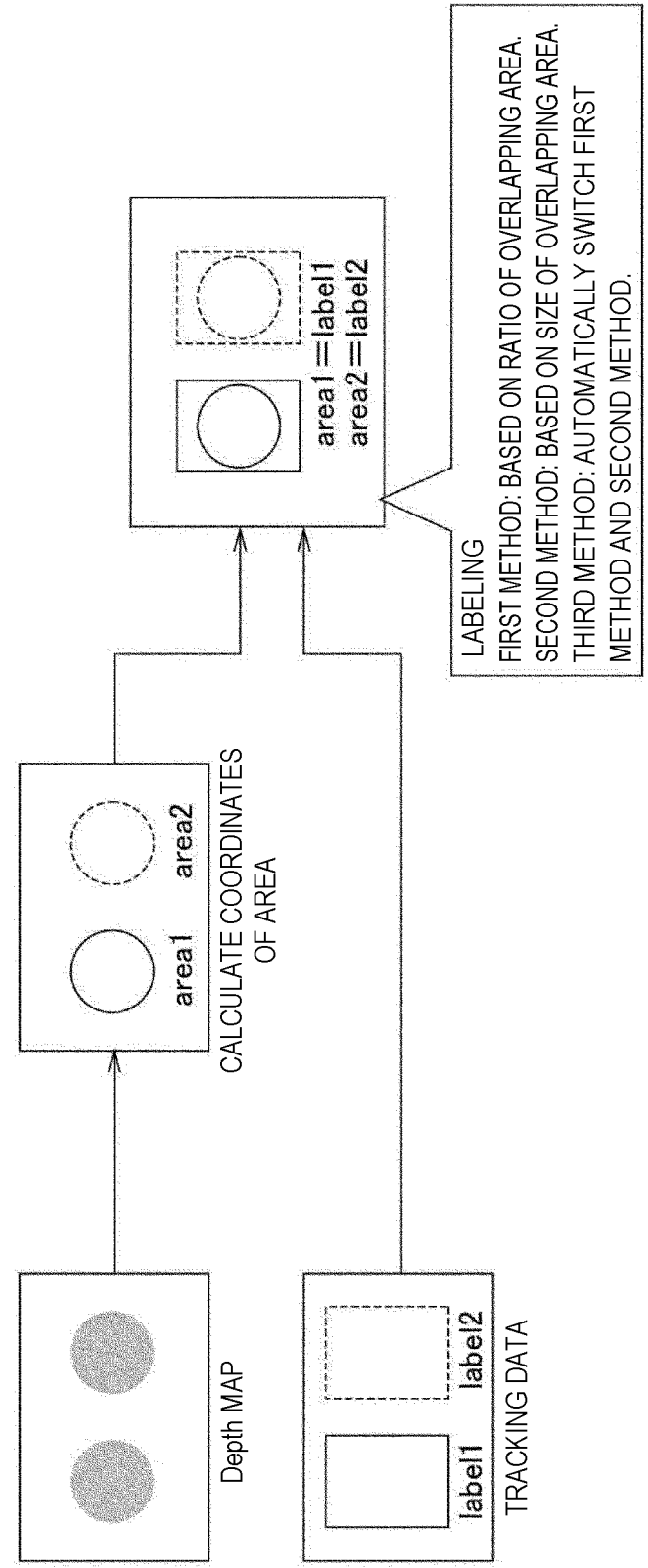
FIG. 2 is a reference diagram illustrating a labeling method.

In order to solve the problems of the present invention, the present embodiment proposes a method of associating a Depth map and tracking data with a label, as illustrated in FIG. 2. As a labeling method, a first method is used in which the ratio of areas overlapping each other is used as a reference in consideration of characteristics of the Depth map. In order to cope with the mixing of the subject area (noise) other than the person, a second method is used in which the sizes of the areas overlapping each other are used as a reference. The first and second methods can be manually switched and used according to setting files, and can also be automatically switched and used (third method).

<Configuration of Information Integration Device>

Figure 3:
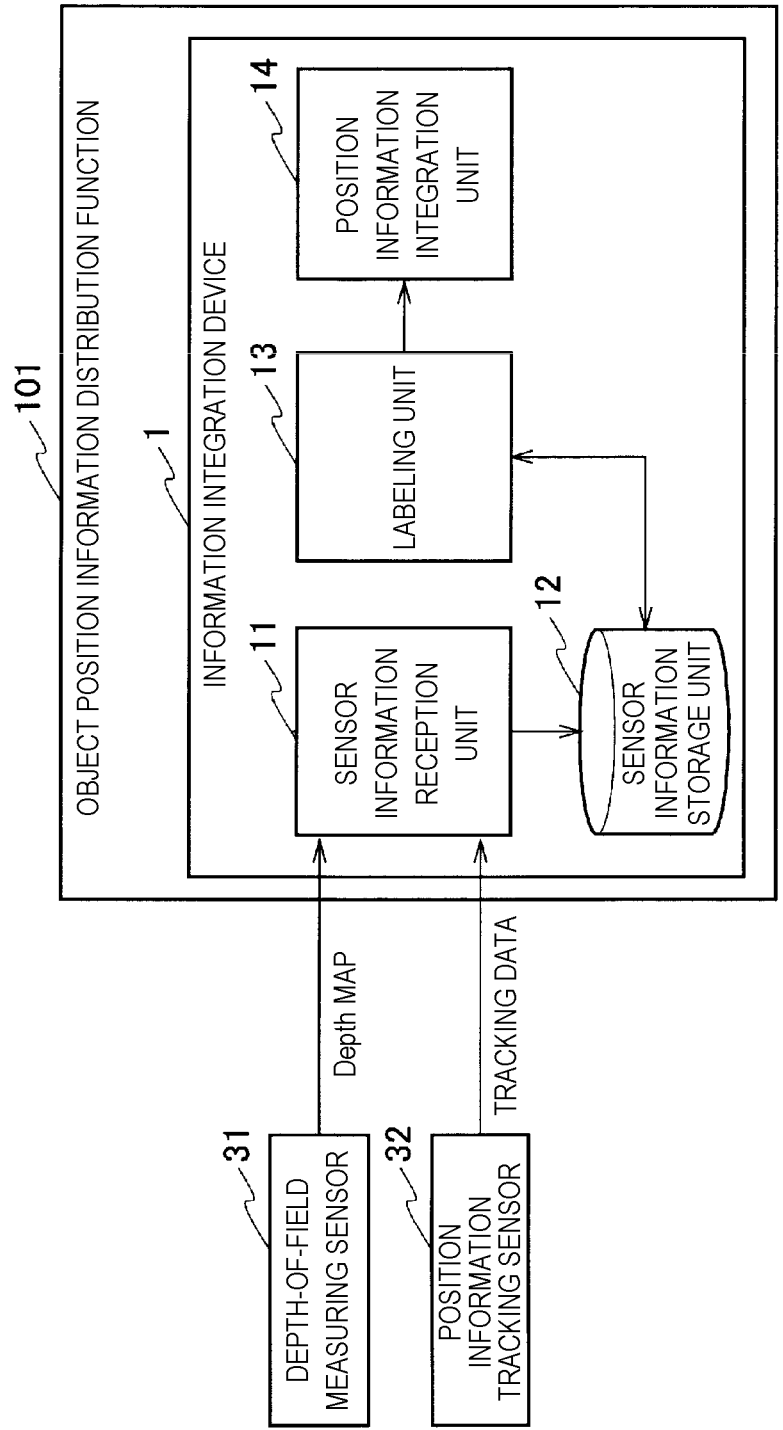
FIG. 3 is a diagram illustrating a functional example of an information integration device.

In this regard, in this embodiment, an information integration device 1 is mounted on the object position information distribution function 101. FIG. 3 is a diagram illustrating an example of a functional block of the information integration device 1. The information integration device 1 includes a sensor information reception unit 11, a sensor information storage unit 12, a labeling unit. 13, and a position information integration unit 14.

The sensor information reception unit 11 has a function of receiving position information acquired by a plurality of sensors. Here, a case will be described as an example in which the Depth map of the object output from the depth-of-field measuring sensor 31 and the tracking data output from the position information tracking sensor 32 are received as the sensor information. The received Depth map and tracking data are data obtained by measuring the same object at predetermined time intervals. The Depth map includes a depth value (data for identifying a position in a depth direction) indicating the depth information of the object. Here, a two-dimensional area of the subject identified by the Depth map is called an object area. The tracking data includes a label indicating the object and information for identifying an area (label area) occupied by the object in an image.

The sensor information storage unit 12 has a function of storing the Depth map and the tracking data received by the sensor information reception unit 11 in a readable manner in association with each other. The Depth map and the tracking data to be associated with each other preferably have the same time stamp given, but may be associated with each other to have a time difference between them being equal to or less than a threshold value.

The labeling unit 13 has, as a first method, a function of associating a label corresponding to a label area included in the tracking data with an object area having the largest ratio of the overlapping area overlapping the label area included in the tracking data with respect to the object area, among the plurality of object areas included in the Depth map.

In addition, the labeling unit 13 has, as a second method, a function of associating a label corresponding to a label area included in the tracking data with an object area having the largest size of the overlapping area overlapping the label area included in the tracking data, among the plurality of object areas included in the Depth map.

Further, the labeling unit 13 has, as a third method, a function of performing the first method in which the label is associated with the object area having the largest ratio of the overlapping area with the label area when the plurality of object areas do not include a noise area and switching to the second method in which the label is associated with the object area having the largest size of the overlapping area with the label area when the plurality of object areas include a noise area. Whether it is a noise area is determined by, for example, a method of determining an object area having a smaller size than a predetermined threshold as a noise area or a method of determining an object area as a noise area when an absolute value of difference in the size between the object area and another object area is larger than a threshold value.

Further, when a plurality of associating candidates exist in the first method or the second method (that is, when there are a plurality of object areas having the same overlapping area and the same size of the overlapping area), the labeling unit 13 may have a function of generating one integrated area including the plurality of candidates to associate the area with the label or selecting any one of the object areas based on a predetermined criterion to associate the selected object area with the label, so that the same label is not attached to the plurality of object areas.

Further, when one object area is included in each of the plurality of label areas, the labeling unit 13 has a function of associating a label corresponding to each label area with the plurality of object areas that are the same as one object area.

The position information integration unit 14 has a function of calculating three-dimensional position information of the object with high accuracy by integrating the position information of the object due to the Depth map and the position information of the tracking data that are combined by the labeling.

The above-described information integration device 1 can be realized by a computer equipped with a CPU, a memory, an input/output interface, and the like. Further, an information integration program for causing a computer to function as the information integration device 1 and a storage medium for the information integration program can also be created.

<Operation (First Method) of Information Integration Device>

Figure 4:
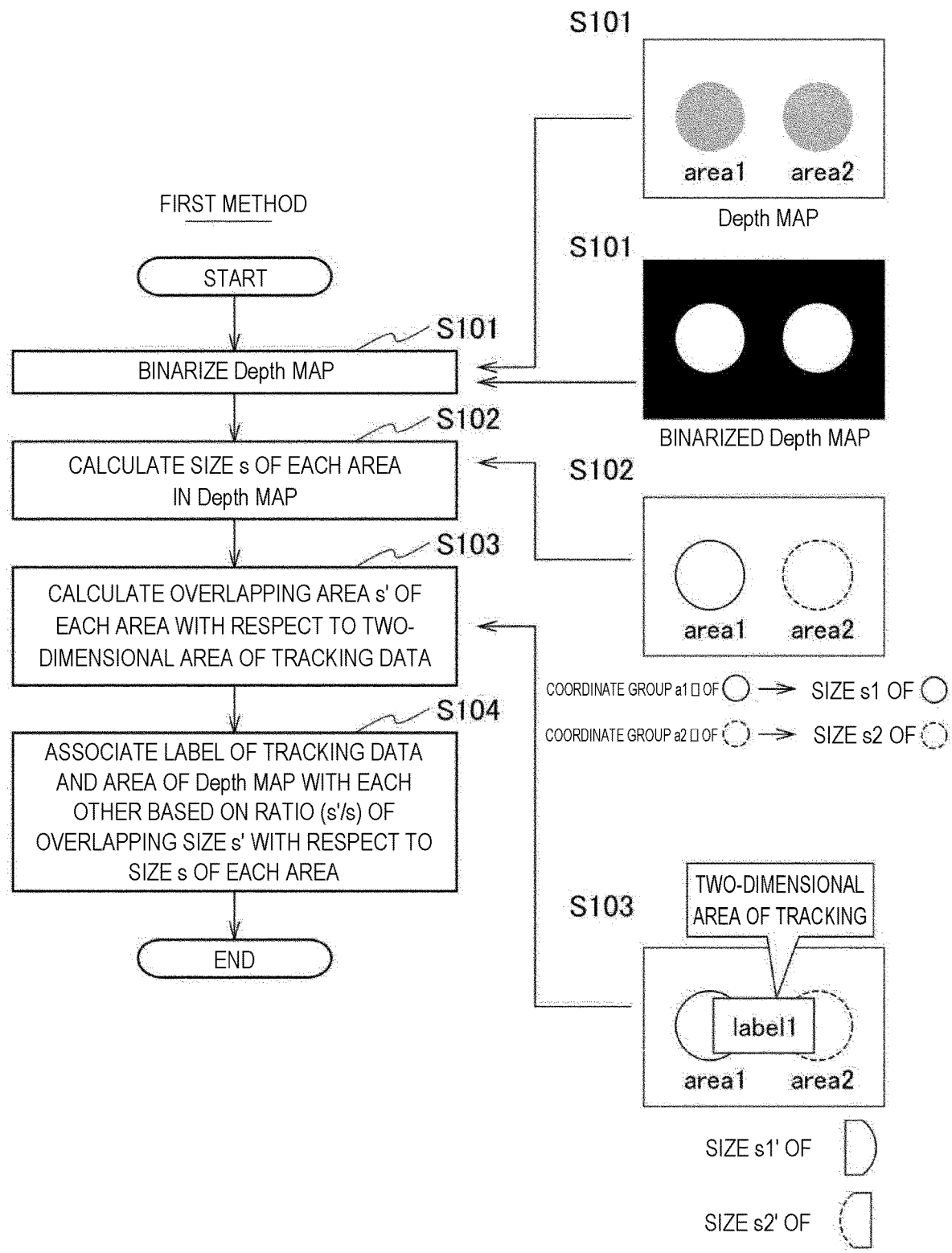
FIG. 4 is a diagram illustrating an example of a processing flow of a first method.

Next, the operation of the first method of the information integration device 1 will be described. FIG. 4 is a diagram illustrating a processing flow of the first method performed by the labeling unit 13. The first method is a method of associating a label with an object area having the largest ratio of the overlapping area with respect to the two-dimensional area of the tracking data.

Step S101;

First, the labeling unit 13 reads the Depth map from the sensor information storage unit 12, and binarizes the depth value included in the read Depth map. The binarization process can be realized using an existing method, for example, using an inRange function of OpenCV (Open Source Computer Vision Library).

Step S102;

Next, the labeling unit 13 detects a coordinate group of the contour of the object included in the Depth map after the binarization and calculates a size s of the area in the contour. In the present embodiment, it is assumed that two object areas are detected as candidates to be labeled with the same label, and the labeling unit 13 calculates sizes s1 and s2 of the two candidate object areas, respectively.

Step S103;

Next, the labeling unit 13 reads the tracking data corresponding to the Depth map from the sensor information storage unit 12, and calculates overlapping sizes s1' and s2' in which the two candidate object areas overlap the label area included in the read tracking data. When there is no tracking sensor at the same time, tracking data of a time near the time stamp of the Depth map may be used, for example. For example, a linear interpolation may be performed using a plurality of tracking data of the time near the time stamp of the Depth map to generate tracking data at the time stamp of the Depth map, and the generated tracking data may be used. Alternatively, as a general rule, the tracking data of the time near the time stamp of the Depth map (having the closest time) is assigned. The assignment may be skipped when the tracking data is already assigned to the time stamp of the Depth map, and the tracking data assigned to the time stamp next to before may be repeatedly assigned when there is a time stamp of the Depth map that has not been assigned yet.

Hereinafter, a case will be described as an example in which the label area included in the tracking data is a rectangular two-dimensional area representing a subject area in the image.

Figure 5:
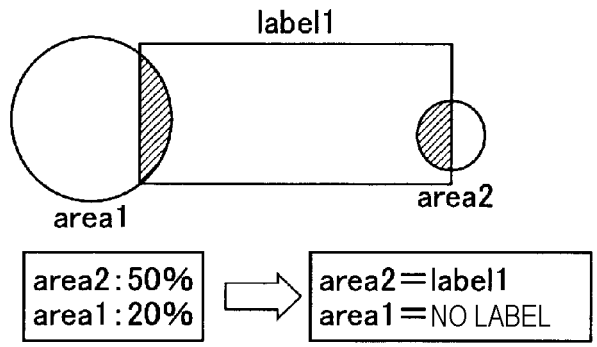
FIG. 5 is a diagram illustrating an example of labeling of a first method.
Figure 5:
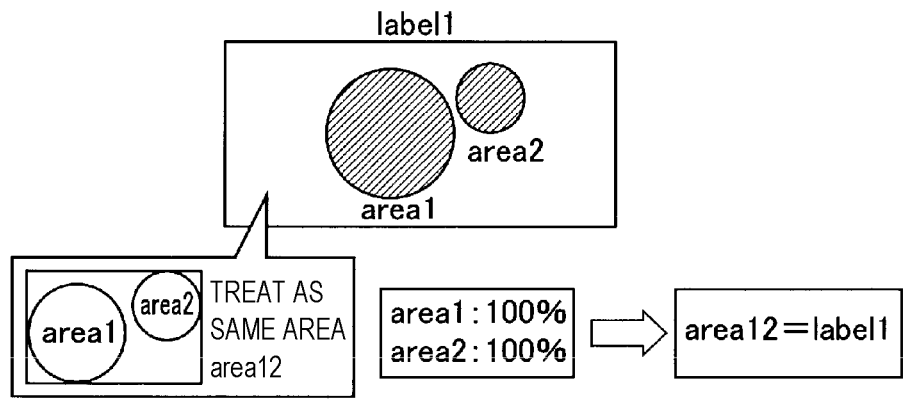
Figure 5:
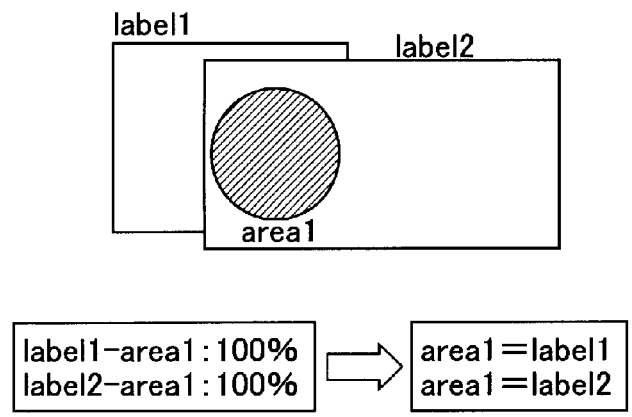

Step S104;

Finally, the labeling unit 13 divides the overlapping sizes s1' and s2' of the overlapping areas of the two candidate object areas by the sizes s1 and s2 of the candidate object areas, respectively, to obtain ratios (s1'/s1 and s2'/s2) of the overlapping sizes s' with respect to the size s of the candidate object areas, and assigns the label of the tracking data to the candidate object area having the largest ratio. Thereby, as illustrated in FIG. 5(a), for example, when the ratio of the overlapping size s' of the candidate object area 1 (area1) is 20% and the ratio of the overlapping size s' of the candidate object area 2 (area1) is 50%, a label 1 (label1) is associated only with the candidate object area 2.

On the other hand, when s1'/s1=s2'/s2, the labeling unit 13 treats the two candidate object areas 1 and 2 as the same object area 12, and assigns the label 1 to the same object area 12. For example, as illustrated in FIG. 5(b), it is assumed that the entire area of each of the two candidate object areas 1 and 2 is included in the rectangular two-dimensional area and a relation of s1'/s1=s2'/s2=100% is satisfied.

In addition, when one candidate object area 1 is included in each of the two rectangular two-dimensional areas, the labeling unit 13 uses the one candidate object area as a different object area 1 to assign the labels 1 and 2 of the rectangular two-dimensional areas to the different object area 1. For example, as illustrated in FIG. 5(c), it is assumed that the entire area of the one candidate object area 1 is included in each of the two rectangular two-dimensional areas and a relation of "s1'/s1 for rectangular two-dimensional area 1"="s1'/s1 for rectangular two-dimensional area 2"=100% is satisfied.

As described above, according to the first method, when a plurality of candidate object areas correspond to one label in the synchronized Depth map and tracking data, the label is associated with the candidate object area having the largest ratio of the overlapping area, so that the label of the tracking data can be correctly associated with the object area of the Depth map and the position information of the object in the Depth map and the position information of the object of the tracking data can be correctly combined. As a result, it is possible to integrate the position information that are correctly combined, and to improve the accuracy of the three-dimensional position information of the object.

<Operation (Second Method) of Information Integration Device>

Figure 6:
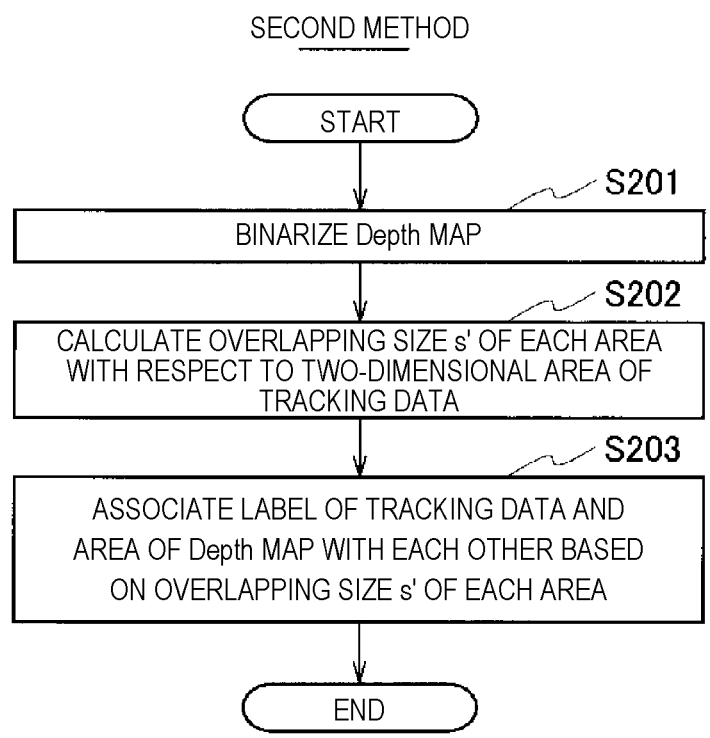
FIG. 6 is a diagram castrating an example of a Processing low of a second method.

Next, the operation of the second method of the information integration device 1 will be described. FIG. 6 is a diagram illustrating a processing flow of the second method performed by the labeling unit 13. The second method is a method of associating the label with the object area having the largest size of the overlapping area with respect to the two-dimensional area of the tracking.

Step S201;
First, the labeling unit 13 reads a Depth map from the sensor information storage unit 12, and binarizes a depth value included in the read Depth map.

Step S202;
Next, the labeling unit 13 detects a coordinate group of the contour of the object included in the Depth map after the binarization. Then, the labeling unit 13 reads a tracking data corresponding to the Depth map from the sensor information storage unit 12, and uses the detected coordinate group of the contour of the object to calculate overlapping sizes s1' and s2' in which two candidate object areas overlap the rectangular two-dimensional within a frame line included in the read tracking data, respectively.

Step S203;
Finally, the labeling unit 13 assigns the label of the tracking data to the candidate object area having the largest sizes of s1' and s2' for the two candidate object areas. Thereby, as illustrated in FIG. 7(a), for example, when an overlapping size s' of a candidate object area 1 is 30 and an overlapping size s' of a candidate object area 2 is 20, a label 1 is associated only with the candidate object area 1.

On the other hand, when s1'=s2', for example, the labeling unit 13 assigns the label 1 to an object area 12 in which the two candidate object areas 1 and 2 are integrated.

Figure 7:
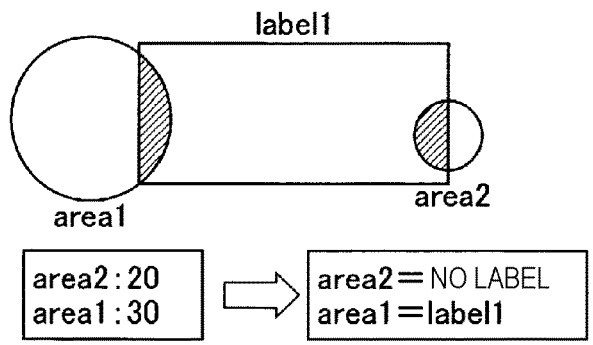
FIG. 7 is a diagram illustrating an example of labeling of the second method.
Figure 7:
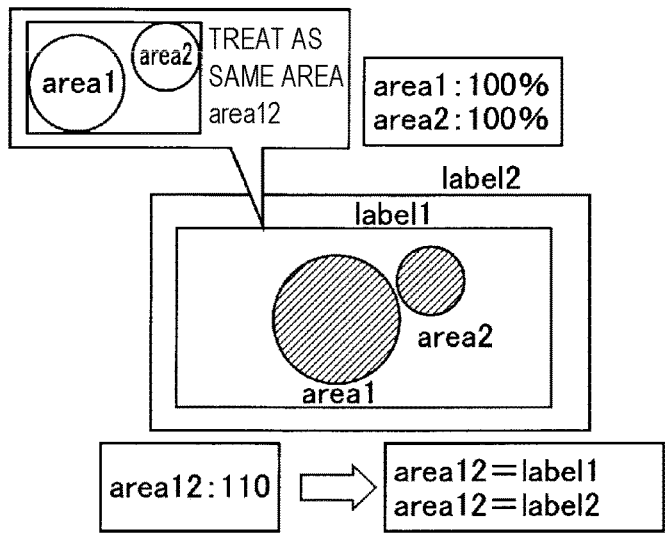
Figure 7:
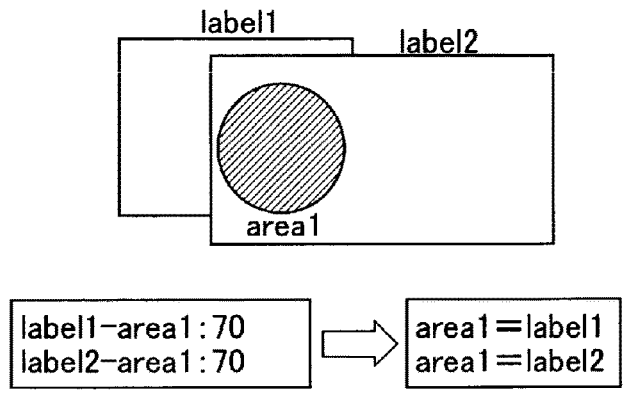

In addition, as illustrated in FIG. 7(b), even when the entire area of each of the two candidate object areas 1 and 2 is included in each of the two rectangular two-dimensional areas and a relation of s1'/s1=s2'/s2=100% is satisfied, the labeling unit 13 treats the two candidate object areas 1 and 2 as the same object area 12, and assigns the labels 1 and 2 of the rectangular two-dimensional areas to the same object area 12, respectively.

In addition, when one candidate object area 1 is included in each of the two rectangular two-dimensional areas, the labeling unit 13 uses the one candidate object area 1 as a different object area 1 to assign the labels 1 and 2 of the rectangular two-dimensional areas to the different object area 1. For example, as illustrated in FIG. 7(c), it is assumed that the entire area of the one candidate object area 1 is included in each of the two rectangular two-dimensional areas and a relation of "s1 for rectangular two-dimensional area 1"="s1 for rectangular two-dimensional area 2" is satisfied.

As described above, according to the second method, when a plurality of candidate object areas correspond to one label in the synchronized Depth map and tracking data, the label is associated with the candidate object area having the largest size of the overlapping area, so that the label of the tracking data can be correctly associated with the object area of the Depth map and the position information of the object in the Depth map and the position information of the object of the tracking data can be correctly combined. As a result, it is possible to integrate the position information that are correctly combined, and to improve the accuracy of the three-dimensional position information of the object.

<Operation (Third Method) of Information Integration Device>

Figure 8:
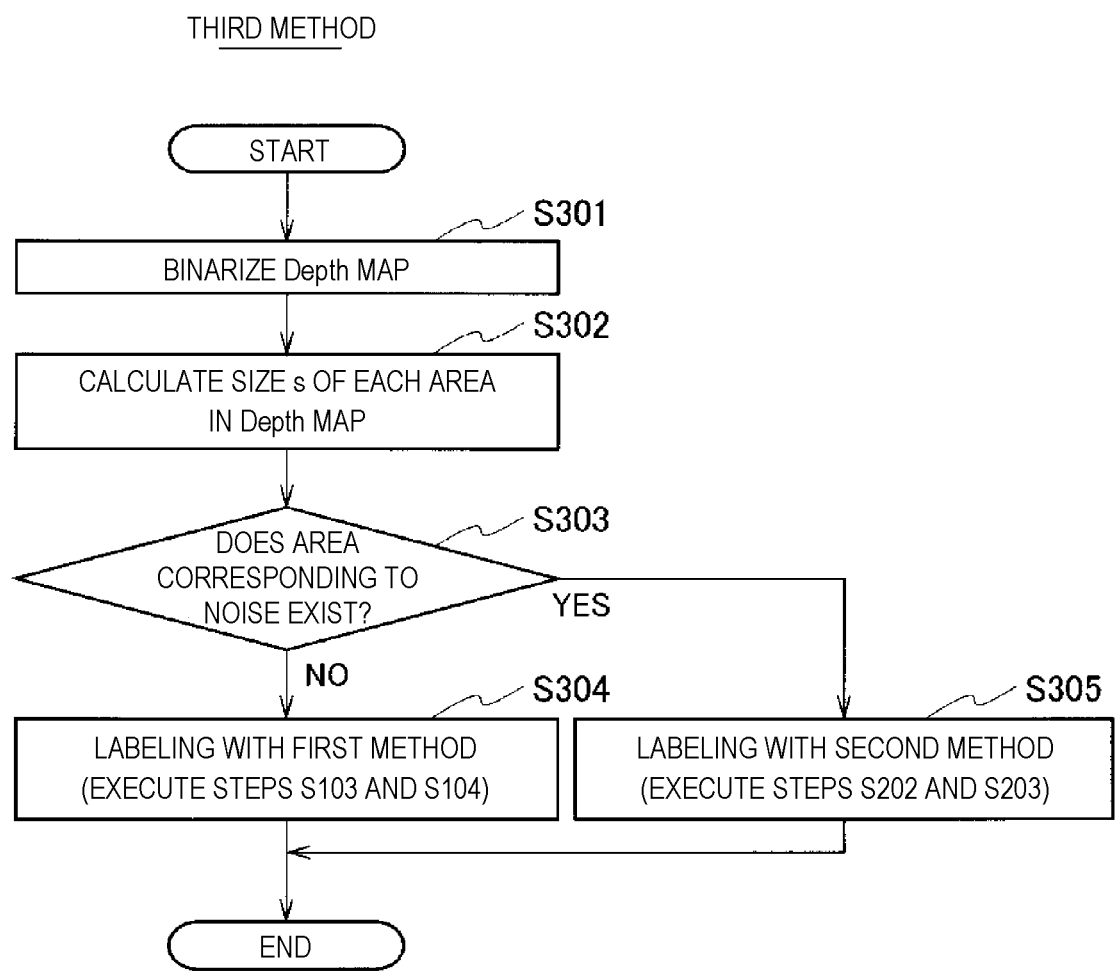
FIG. 8 is a diagram illustrating an example of a processing flow of a third method.
Figure 9:
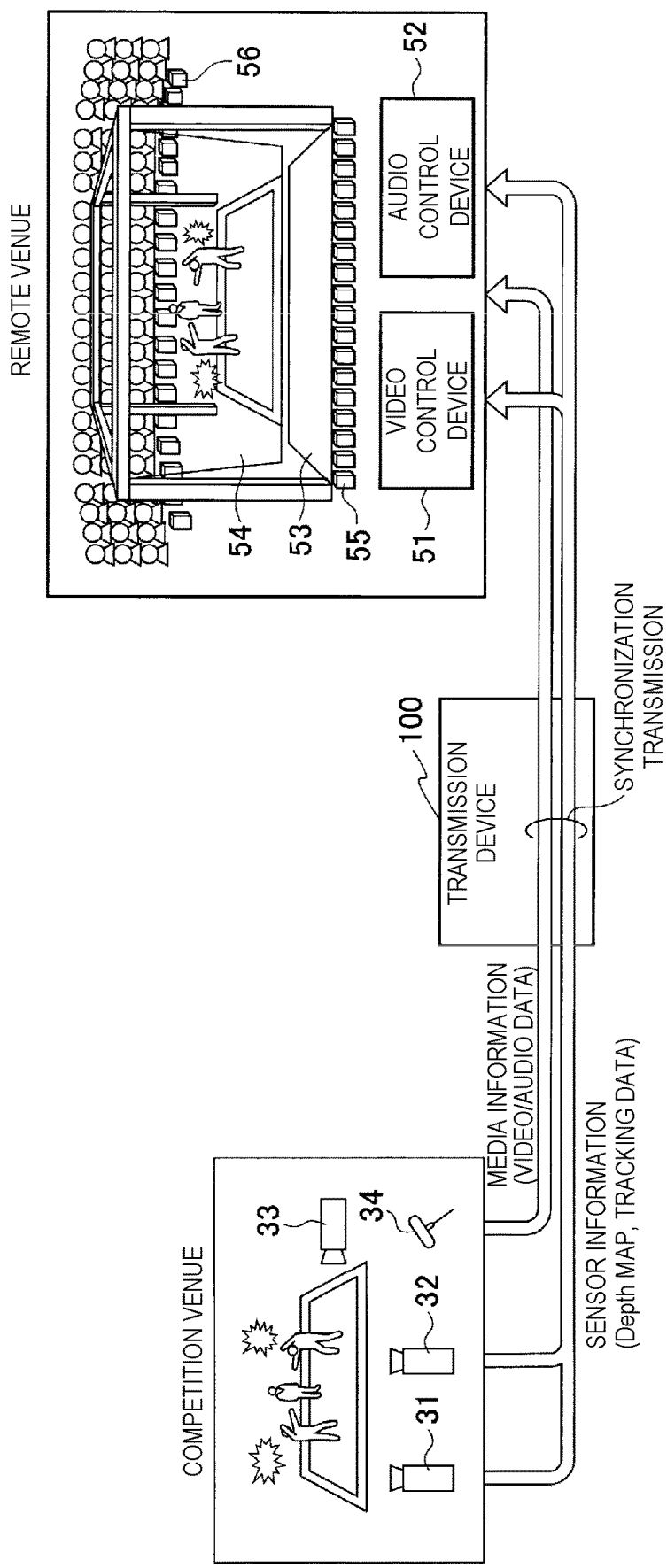
FIG. 9 is a diagram illustrating an image of synchronous transmission by the transmission device.
Figure 10:
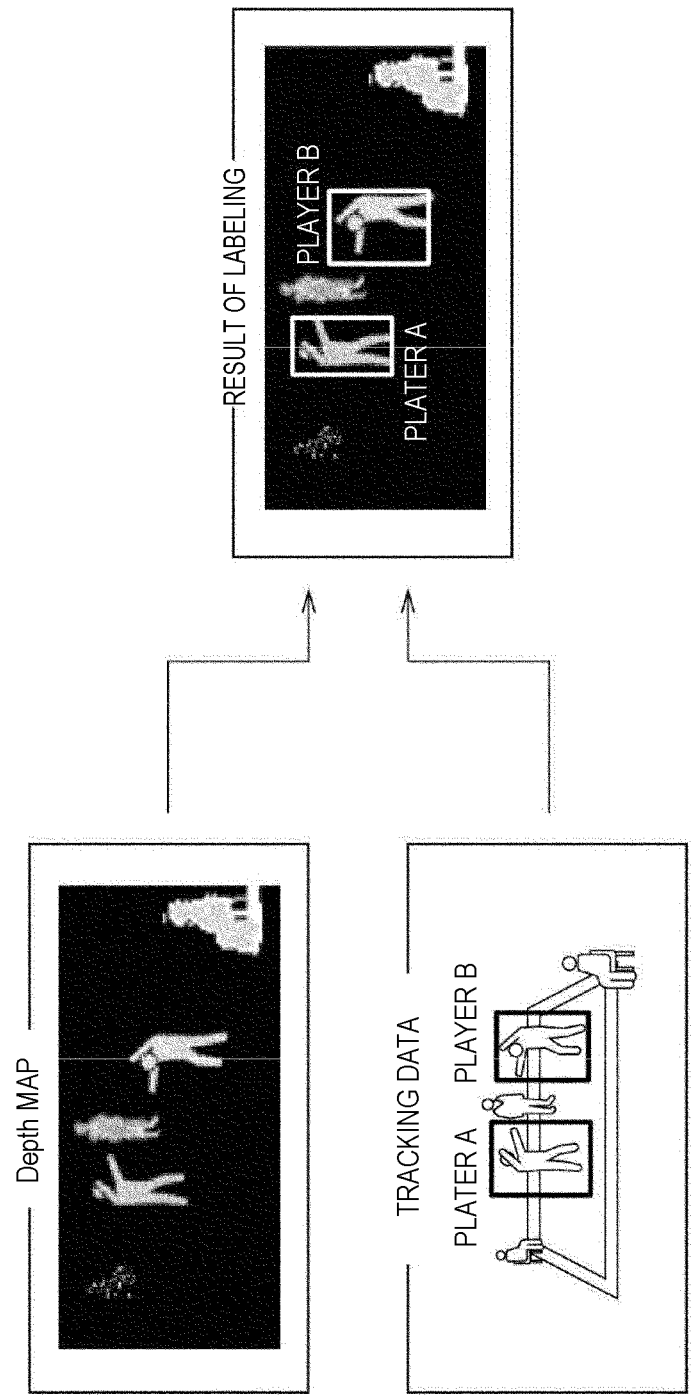
FIG. 10 is a reference diagram for explaining a problem.
Figure 11:
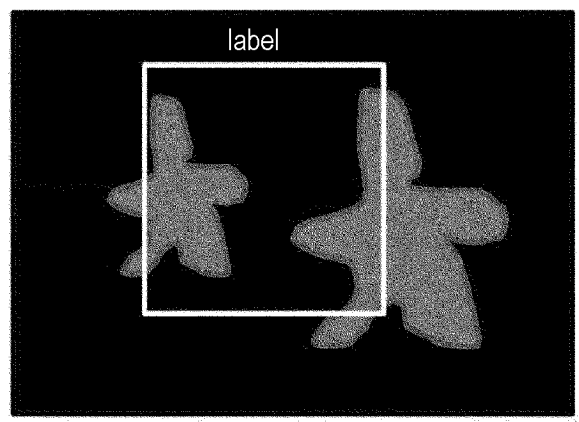
FIG. 11 is a reference diagram for explaining the problem.
Figure 11:
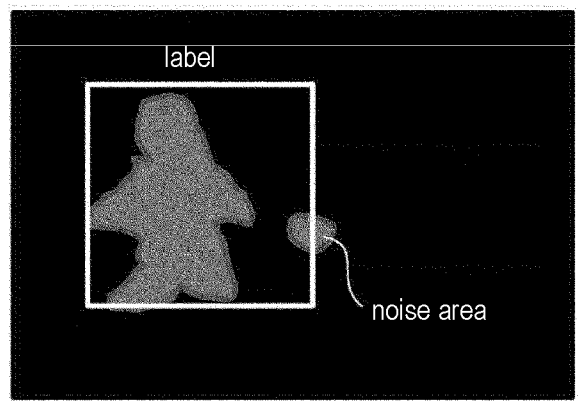

Next, the operation of the third method of the information integration device 1 will be described. FIG. 8 is a diagram illustrating a processing flow of the third method performed by the labeling unit 13. The third method is a method of switching the labeling methods of the first method and the second method. Usually, labeling is performed using the first method, and switching to the second method is performed when an area considered to be noise is detected to remove the object area considered to be noise from a labeling target.

Step S301;
First, the labeling unit 13 reads a Depth map from the sensor information storage unit 12, and binarizes a depth value included in the read Depth map.

Step S302;
Next, the labeling unit 13 detects coordinate groups of the contours of two candidate object areas included in the Depth map after the binarization, respectively, and calculates sizes s1 and s2 of the two candidate object areas, respectively.

Step S303;
Next, the labeling unit 13 determines whether the size of any of the two candidate object areas is equal to or smaller than a threshold value A or whether a size difference between the two candidate object areas is equal to or larger than a threshold value B. Then, when the size of any candidate object areas is not equal to or smaller than the threshold value A and the size difference between the two candidate object areas is not equal to or larger than the threshold value B, the process proceeds to step S304. On the other hand, when the size of any of the candidate object areas is equal to or smaller than the threshold value A and the size difference between the two candidate object areas is equal to or larger than the threshold value B, the process proceeds to step S305.

Step S304;
The labeling unit 13 regards that the two candidate object areas are not noise areas, and performs labeling using the first method based on the ratio of the overlapping areas.

Step S305;
The labeling unit 13 regards that the candidate object area having the size equal to or smaller than the threshold value A is a noise area, and performs labeling using the second method based on the size of the overlapping area. In addition, a size difference between the object areas may be calculated, and the object area having the smaller size may be regarded as the noise area when the size difference (absolute value thereof) is equal to or larger than the threshold value B. This is because the possibility of noise is high when the size of the object area is significantly different from other object areas.

As described above, according to the third method, when the Depth map includes the noise area, the first method based on the ratio of the overlapping area is switched to the second method based on the size of the overlapping area, so that the label of the tracking data can be more correctly associated with the object area of the Depth map and the accuracy of the three-dimensional position information of the object can be further improved.

<Method of Calculating Position Information During Labeling>

A method of detecting the coordinate group (position information) of the contour of the object from the Depth map can be realized using an existing method. For example, a Z value (depth) is obtained from the maximum value and the minimum value of the depth value of the Depth map, and an X value (width) and a Y value (height) of the contour coordinate are calculated from the contour, depth and internal parameters of the Depth map (the maximum/minimum value system of the Depth map). As the Z value (depth), the most frequent value of the depth value of the Depth map may be used (the most frequent value system of the Depth map). The maximum/minimum value system and the most frequent value system of the Depth map are selectable.

Further, the position information of the frame line of the tracking data used for grasping the rectangular two-dimensional area may be newly obtained using the position information output from the position information tracking sensor 32. For example, the local coordinate system of the tracking data is used as the Z value (depth), and an X value (width) and a Y value (height) of a frame line coordinate is calculated from the contour, depth, internal parameters of the Depth map (tracking data depth system). Further, a value obtained by converting the local coordinate system into the global coordinate system for only tracking data, generating a centroid point from a rectangle, and performing time subsampling processing may be used (tracking through system). The tracking data depth system and the tracking through system are selectable.

<Effect>

According to the present embodiment, the information integration device 1 detects the object area having the largest ratio of the overlapping area overlapping the label area included in the tracking data with respect to the object area from the plurality of the object areas included in the Depth map to associates the label included in the tracking data with the detected object area. Thereby, the information integration device 1 can correctly combine the position information of the object in the Depth map and the position information of the object of the tracking data, and can improve the accuracy of the three-dimensional position information of the object.

In addition, according to the present embodiment, the information integration device 1 associates the label included in the tracking data with the object area having the largest size of the overlapping area overlapping the label area included in the tracking data among the plurality of object areas included in the Depth map. Thereby, the information integration device 1 can correctly combine the position information of the object in the Depth map and the position information of the object of the tracking data, and can improve the accuracy of the three-dimensional position information of the object.

In addition, according to the present embodiment, the information integration device 1 performs the first method in which the label is associated with the object area having the largest ratio of the overlapping area with the label area when the plurality of object areas do not include the noise area, and performs switching to the second method in which the label is associated with the object area having the largest size of the overlapping area with the label area when the plurality of object areas include the noise area, so that the accuracy of the three-dimensional position information of the object can be further improved.

REFERENCE SIGNS LIST

1 Information integration device
11 Sensor information reception unit
12 Sensor information storage unit
13 Labeling unit
14 Position information integration unit
31 Depth-of-field measuring sensor
32 Position information tracking sensor
33 Imaging device
34 Sound collection device
51 Video control device
52 Audio control device
53 Naked eye 3D display screen
54 Virtual image display panel
55 Wavefront synthesis speaker array (for competition sound)
56 Wavefront synthesis speaker array (for cheer sound)
100 Transmission device
101 Object position information distribution function
102 Media information encoding function
103 Position information/media information binding management function
104 Object position information reception function
105 Media information decoding function
106 Object position information integration function

The invention claimed is:

1. An information integration method performed by a transmission device for synchronously transmitting media information and sensor information on an object in a first space to a second space, the method comprising the steps performed by
an information integration device including one or more processors:
a first step of receiving, as sensor information, a Depth map of an object and tracking data including label areas, which are areas of the object in an image, and a label indicating the object; and
a second step of associating a label corresponding to the label area included in the tracking data with an object area having a largest ratio of overlapping areas, among a plurality of object areas included in the Depth map, overlapping the label areas included in the tracking data with respect to the object areas or an object area having a largest size of the overlapping areas overlapping the label areas included in the tracking data.

2. The information integration method according to claim 1, wherein
in the second step, the label is associated with one area including the plurality of object areas when ratios of the plurality of overlapping areas to be compared is equal to each other or when sizes of the plurality of overlapping areas to be compared is equal to each other.

3. The information integration method according to claim 1, wherein
in the second step, when one object area is included in each area of the plurality of label areas, a label corresponding to each of the label areas is associated with each of the plurality of object areas that are the same as the one object area.

4. The information integration method according to claim 1, wherein
in the second step, a label is associated with the object area having the largest ratio of the overlapping area when a noise area is not included in the plurality of object areas, and a label is associated with the object area having the largest size of the overlapping area when the noise area is included in the plurality of object areas.

5. An information integration device which is included in a transmission device for synchronously transmitting media information and sensor information on an object in a first space to a second space, the information integration device comprising:
a sensor information reception unit, including one or more processors, configured to receive, as sensor information, a Depth map of an object and tracking data including label areas, which are areas of the object in an image, and a label indicating the object; and
a labeling unit, including one or more processors, configured to associate a label corresponding to the label area included in the tracking data with an object area having a largest ratio of overlapping areas, among a plurality of object areas included in the Depth map, overlapping the label areas included in the tracking data with respect to the object areas or an object area having a largest size of the overlapping areas overlapping the label areas included in the tracking data.

6. A non-transitory computer readable medium storing an information integration program for causing a computer to execute:
   a first step of receiving, as sensor information, a Depth map of an object and tracking data including label areas, which are areas of the object in an image, and a label indicating the object; and
   a second step of associating a label corresponding to the label area included in the tracking data with an object area having a largest ratio of overlapping areas, among a plurality of object areas included in the Depth map, overlapping the label areas included in the tracking data with respect to the object areas or an object area having a largest size of the overlapping areas overlapping the label areas included in the tracking data.

7. The information integration device according to claim 5, wherein the labeling unit is further configured to:
   associate the label with one area including the plurality of object areas when ratios of the plurality of overlapping areas to be compared is equal to each other or when sizes of the plurality of overlapping areas to be compared is equal to each other.

8. The information integration device according to claim 5, wherein the labeling unit is further configured to:
   when one object area is included in each area of the plurality of label areas, associate a label corresponding to each of the label areas with each of the plurality of object areas that are the same as the one object area.

9. The information integration device according to claim 5, wherein the labeling unit is further configured to:
   associate a label with the object area having the largest ratio of the overlapping area when a noise area is not included in the plurality of object areas, and associate a label with the object area having the largest size of the overlapping area when the noise area is included in the plurality of object areas.

10. The non-transitory computer readable medium according to claim 6, wherein:
    in the second step, the label is associated with one area including the plurality of object areas when ratios of the plurality of overlapping areas to be compared is equal to each other or when sizes of the plurality of overlapping areas to be compared is equal to each other.

11. The non-transitory computer readable medium according to claim 6, wherein:
    in the second step, when one object area is included in each area of the plurality of label areas, a label corresponding to each of the label areas is associated with each of the plurality of object areas that are the same as the one object area.

12. The non-transitory computer readable medium according to claim 6, wherein:
    in the second step, a label is associated with the object area having the largest ratio of the overlapping area when a noise area is not included in the plurality of object areas, and a label is associated with the object area having the largest size of the overlapping area when the noise area is included in the plurality of object areas.

* * * * *